(12) United States Patent
Hanel et al.

(10) Patent No.: US 12,261,438 B2
(45) Date of Patent: Mar. 25, 2025

(54) CONVERTER ARRANGEMENT AND METHOD OF OPERATION FOR SAID CONVERTER ARRANGEMENT

(71) Applicant: Siemens Energy Global GmbH & Co. KG, Munich (DE)

(72) Inventors: Lutz Hanel, Lauf (DE); German Kuhn, Erlangen (DE); Christian Pfeifer, Erlangen (DE); Martin Pieschel, Altdorf (DE); Kunal Sharma, Erlangen (DE); Maximilian Dürre, Erlangen (DE); Michael Karl, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 234 days.

(21) Appl. No.: 17/928,351

(22) PCT Filed: May 29, 2020

(86) PCT No.: PCT/EP2020/064946
§ 371 (c)(1),
(2) Date: Nov. 29, 2022

(87) PCT Pub. No.: WO2021/239244
PCT Pub. Date: Dec. 2, 2021

(65) Prior Publication Data
US 2023/0246442 A1 Aug. 3, 2023

(51) Int. Cl.
*H02J 3/00* (2006.01)
*H02J 3/18* (2006.01)
(52) U.S. Cl.
CPC ............ *H02J 3/1814* (2013.01); *H02J 3/001* (2020.01)

(58) Field of Classification Search
CPC ............ H02J 3/001; H02J 3/1814; H02J 3/00
See application file for complete search history.

(56) References Cited

U.S. PATENT DOCUMENTS

| 5,815,387 | A | | 9/1998 | Aritsuka |
| 5,942,880 | A | * | 8/1999 | Akamatsu ............. H02J 3/1807 323/210 |

(Continued)

FOREIGN PATENT DOCUMENTS

| EP | 3125394 A1 | 2/2017 |
| WO | WO 2019119886 A1 | 6/2019 |

OTHER PUBLICATIONS

Newman, John Michael et al: "An integrated Approach for the Protection of Series Injection Inverters"; IEEE Transactions On Industry Applications; IEEE Service Center; Piscatway; NJ; US; vol. 38; No. 3; May 2, 2002; XP011073468; ISSN: 0993-9994;.

(Continued)

*Primary Examiner* — Gary L Laxton
(74) *Attorney, Agent, or Firm* — Laurence A. Greenberg; Werner H. Stemer; Ralph E. Locher

(57) ABSTRACT

A device controls a power flow in an AC network and has a series converter with a DC side to connect to a DC link and an AC side to connect to the AC network via a series transformer. The device further has a bridging arrangement between the series transformer and the series converter configured to bridge the series converter. The bridging arrangement contains at least one bridging branch having a switching unit with antiparallel thyristors and a resistance in series with the switching unit. Furthermore, a method of operation operates the device.

12 Claims, 2 Drawing Sheets

(56) References Cited

U.S. PATENT DOCUMENTS

| | | | | |
|---|---|---|---|---|
| 6,459,559 | B1* | 10/2002 | Christofersen | H02H 9/04 |
| | | | | 361/124 |
| 10,447,026 | B2* | 10/2019 | Kostakis | H02H 9/043 |
| 11,264,794 | B2 | 3/2022 | Pan et al. | |
| 2018/0309298 | A1* | 10/2018 | Li | H02J 3/36 |

OTHER PUBLICATIONS

Visser A. J. et al: "Direct-coupled cascaded multilevel sag compensator"; Power Electronics Specialists Conference; 2000. PESC 00. 2000 IEEE 31S T Annual; Jun. 18-23, 2000; Piscataway; NJ; USA; IEEE; vol. 1; Jun. 18, 2000; pp . 463-469, XP010517279; ISBN: 978-0-7803-5692-4.

Liu, Jinlian et al. "Comprehensive Power Flow Analyses and Novel Feedforward Coordination Control Strategy for MMC-based UPFC", Energies 2019.

* cited by examiner

CONVERTER ARRANGEMENT AND METHOD OF OPERATION FOR SAID CONVERTER ARRANGEMENT

FIELD AND BACKGROUND OF THE INVENTION

The present invention relates to a device for controlling a power flow in an AC network comprising a series converter with an AC side to connect to said AC network via a series transformer.

As a result of new environmental legislation, rights-of-way issues, construction cost increases, deregulation policies and decentralized power generation, there is an increasing recognition of the necessity to utilize the existing AC transmission system assets to the maximum extent possible.

At the same time high penetration of decentralize renewable generation i.e. wind park based on environment condition, regulation policy of Transmission System Operators (TSO) and Distribution System Operators (DSO) make the operation of transmission system more challenging. In this context, TSOs are facing problems to control the power flow and secure the system efficiently and effectively with existing controller and operation methodology.

The power transmitted over an A.C. transmission line is a function of the line impedance, the magnitude of sending-end and receiving-end voltages, and the phase angle between these voltages. Traditional controllers in transmission system like phase shifting transformers with mechanical tap-changer and fixed series capacitor are used to control power flow.

Another example of a power flow control device is a universal power flow controller (UPFC) comprising two converters (a series and a shunt converter) coupled to each other by their respective DC sides and connected to the AC network via their AC sides (via a series and a shunt connection, respectively. A UPFC is known e.g. from the article "Comprehensive Power Flow Analyses and Novel Feedforward Coordination Control Strategy for MMC-based UPFC" by Liu et al., Energies 2019. Using a UPFC it has become possible to control the load flow more effectively.

However, a fault protection and a post fault recovery of a power flow control device are required to secure the system efficiently and effectively.

In particular, the post fault recovery needs special attention and it is generally solved via generous stability margins which are enabling the system to recover from faults, line and generator outages, and equipment failures. Such methods result, however, in a significant underutilization of the A.C. transmission system. This approach is adequate to old circumstances with centralized conventional generation and signal regulatory entity, but it is largely ineffective in present scenarios.

Following fault ride through control is mentioned in literature: When fault occurs in the power grid, the continuous operation of series converter should be ensured with priority, with the control of UPFC. If current through the series converter exceeds its tolerance capacity, the series converter shall be temporarily out of operation and automatically return to service after grid fault is cleared. The process of returning to service of series converter must not affect the power system, and time from out of operation to returning to service should be less that the time permitted by short term overload or out-of-time operation capability of the controlled transmission line with a certain margin. Subsequently, the UPFC can maintain the shunt converter operating as much as possible through control strategy. From above strategy, reinsertion of UPFC or post fault recovery is very much delayed approximately 1 sec to 10 sec. However, due to high penetration of renewables this strategy of post fault recovery will not work most of transmission network will violate the n−1 criterion. Therefore, post fault recovery must be done in hundreds of msec to ensure the stability of grid.

SUMMARY OF THE INVENTION

The object of the present invention is therefore to address the above described problems in the context of a power flow control device and its control.

This object is according to a first aspect achieved by a device for controlling a power flow in an AC network according to the independent device claim.

The object is according to a second aspect achieved by a method of operation for a device for controlling a power flow in an AC network according to the independent method claim.

In accordance with the first aspect of the invention the device for controlling a power flow in an AC network comprises a bypassing arrangement, which in the context of the present invention will be also referred to as a bridging arrangement between said series transformer and said series converter configured to bypass/bridge said series converter, wherein the bridging arrangement comprises at least one bridging branch comprising a switching unit with antiparallel thyristors and a resistance in series with said switching unit. The series transformer may have network sided windings which in operation of the device are series-connected to the AC network lines. The bridging arrangement preferably is configured to short-circuit the corresponding converter-side windings of the series transformer thus bridging the converter, e.g. by providing bridging paths between its respective AC terminals. The antiparallel thyristors are characterized by opposite forward conducting directions. The switching unit may comprise several pairs of antiparallel thyristors arranged in series.

In case of a fault e.g. a 3-phase to ground fault, single phase to ground fault etc., the series converter can be bypassed and thus protected by the switching unit. The use of thyristor semiconductor switches provides a particularly fast and reliable protection for the series converter.

Due to the additional resistance in the bridging arrangement current/voltage transients during fault can be limited. In addition, balancing of the series converter, if appropriate, can be performed during recovery of the system due to availability of voltage across the resistance in the bridging arrangement.

The series converter may have a DC side to connect to a DC link. The DC link may e.g. be connected to an energy storage arrangement or to a DC side of another converter. According to some alternative examples, the series converter can comprise converter branches connected in a delta connection with each other, thus being without a DC side.

According to an embodiment, the series transformer has (e.g. three) primary windings configured to be connected in series with corresponding (e.g. in a one-to-one correspondence) phase lines of said AC network/transmission system and wherein the series transformer further has secondary windings connected to each other in a delta connection and thus forming respective delta branches, wherein the bridging arrangement comprises three bridging branches each of them arranged in parallel to a respective delta branch. With the series converter having a number of AC terminals corresponding to the number of said AC network phase lines, each pair of the AC terminals is connected via a respective bridging branch.

Each of the bridging branches may comprise an arrester in parallel to said switching unit and said resistance. The arrester provides an almost instantaneous protection against overvoltage for the series converter and the series transformer.

Preferably the device further comprises at least one bypass switch for bypassing at least one of said primary windings of said series transformer. In normal or steady state operation of the device the bypass switch is in an open state. Under fault conditions, the bypass switch can be switched to a closed state in order to protect the series converter from an overcurrent. The bypass switch can e.g. be a mechanical circuit breaker.

According to an embodiment, the device is a UPFC device. Accordingly, the device further comprises a shunt converter with an AC side to connect, via a shunt transformer, to said AC network, and a DC side to connect, via said DC link, to said DC side of said series converter. A series voltage is injected in the AC transmission line or network via the series transformer to control power in the transmission line. Therefore, the series converter will exchange active and reactive power with the network. Active power is provided by the shunt converter. Moreover, the voltage in the DC link is controlled by the operation of the shunt converter. One of or both the shunt and the series converter can be voltage sourced converters. There may be a common control system for the shunt and the series converter. In a steady state both converters are configured to inject a suitable voltage into the AC network within corresponding design limits of the UPFC.

Preferably the resistance comprises a resistor element (or a series of separate resistor elements), particularly a dry type resistor element. The resistor element can be designed so it provides a resistance value high enough to reduce transients and allows a balancing of the series converter before its recovery due to availability of residual voltage across it.

According to an embodiment said resistor element is designed so that the corresponding bridging branch has a residual voltage of at least 1 kV, particularly preferably at least 2 kV. Residual voltage is a voltage remaining in the bridging branch while the thyristors are in a conducting state. The proper design of the resistors can be achieved e.g. by their suitable dimensioning.

According to a further embodiment each bridging branch further comprises an inductance in series with said switching unit. Said inductance allows improved limiting of transients in the bridging branch.

The series converter can be a voltage source converter (VSC), in particular a modular multilevel converter (MMC). The MMC is per se known from prior art. It has the advantage of a particularly smooth output sine voltage. The MMC is particularly characterized by converter valves having a multiplicity of switching modules (or submodules) connected in series. Each switching module comprises semiconductor switches of a turn-off type (e.g. IGBT, IGCT, MOSFET or others) and an energy storage element (e.g. capacitor). The semiconductors of any of the switching modules can e.g. be arranged to form a half-bridge or a full-bridge switching module which both are per se known from the prior art.

According to another aspect of the invention a method of operation for a device for controlling a power flow in an AC network is provided, the method comprising the steps of: providing a series converter with a DC side to connect to a DC link and an AC side to connect to said AC network via a series transformer, providing a bridging arrangement between said series transformer and said series converter, said bridging arrangement being configured to bridge said series converter, wherein the bridging arrangement comprises at least one bridging branch comprising a switching unit with antiparallel thyristors and a resistor element in series with said switching unit, and, in case of an internal or an external fault: blocking of said series converter, bridging said series converter by means of the bridging arrangement, and deblocking of said series converter. The blocking of the converter can be initiated by a suitable converter current protection arrangement. If the series converter is an MMC, the blocking of the converter can be performed by blocking of the switching modules (or the semiconductors switches in the modules, respectively). Blocking of the converter prevents a fault current flowing into the converter (e.g. when the thyristors are fired). In order to bridge the series converter the thyristors are actively turned on. The fault current will then be commutated from the series converter to the bridging path. Preferably the deblocking of the converter is initiated only after the fault has been cleared (e.g. via a circuit breaker in the AC line).

According to an embodiment the series converter is an MMC. In this case a balancing of the series converter is preferably performed after its deblocking. Due to various reasons the energies stored in the energy storages of the switching modules may not be equal during the operation of the MMC. This is an undesired effect since it leads to an unequally distributed stress across the energy storages. Balancing of the converter ensures that the voltage or energy differences between the energy storages of different modules remain minimal during operation of the converter. Due to the availability of the residual voltage in the bridging branch the balancing of the converter can be started before the converter returns to normal operation. Balancing methods (control schemes) for modular multilevel converters are per se known from the prior art.

Preferably the method further comprises the step of detecting the fault and deciding, based on a measurement of an AC line current, whether an internal fault or an external fault is present. The fault which eventually leads to the blocking of the series converter can in general be an external fault or an internal fault. Depending on what kind of fault is present in the system different measures can be taken. For example, if a fault within a UPFC station, the UPFC cannot be inserted in the AC network. Therefore, it is advantageous to differentiate between a fault in the device i.e. in one of its components (internal fault) and a fault in the AC power system outside the device (external fault). The deciding, whether an internal or external fault is present can be performed as follows:

Measure the line current(s) in the AC network;
Compare the measured line current with a predefined external fault threshold;
Compare the measured line current with a predefined internal fault threshold;
Decide, based on the comparison with internal and external fault threshold whether an internal or an external fault is present (or if there is no fault et all).

In the following the invention is explained in more detail in accordance with embodiments shown in the FIGS. 1 to 3.

DETAILED DESCRIPTION OF THE INVENTION

Figure 1:
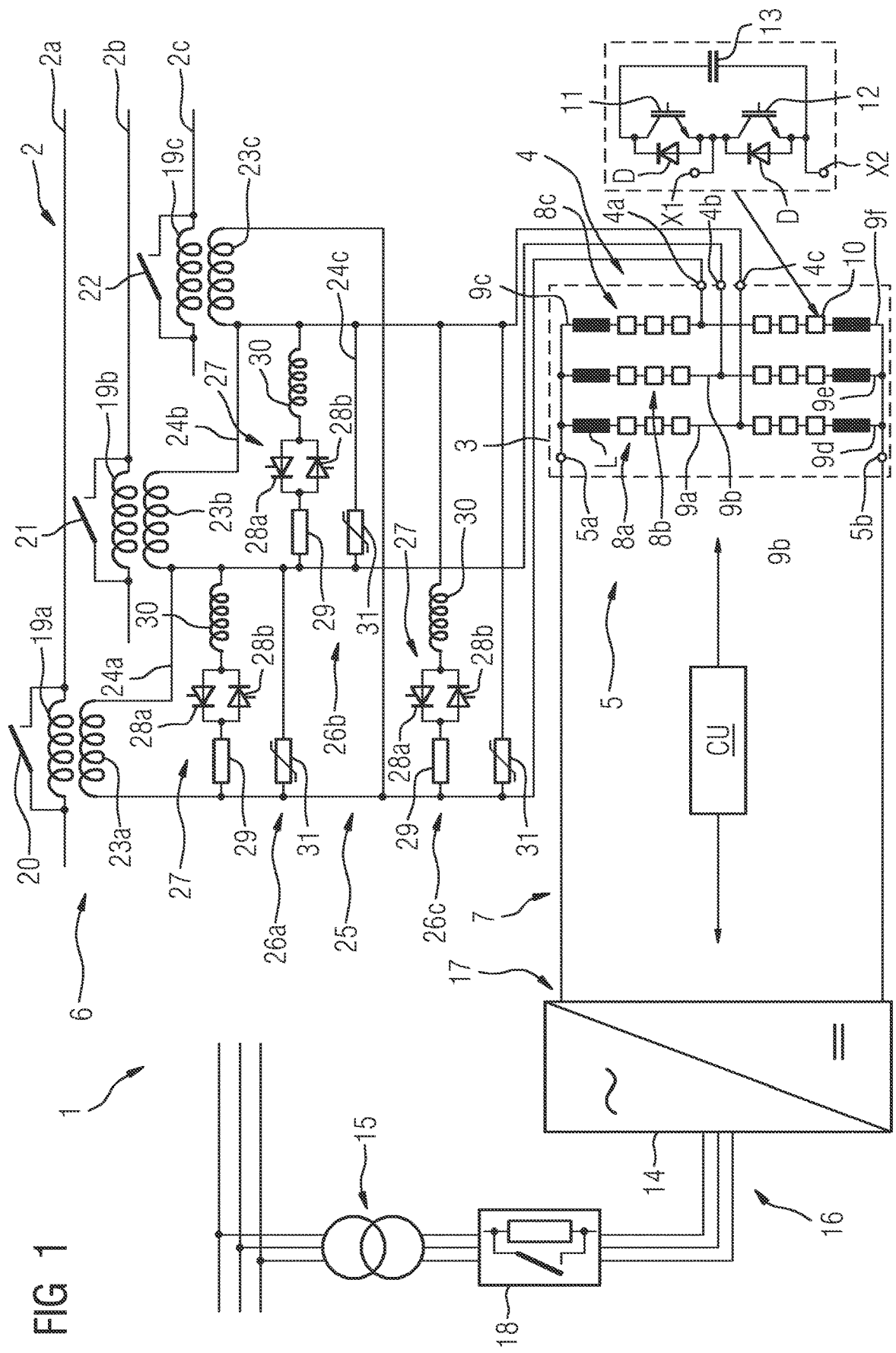
FIG. 1 schematically shows an embodiment of a device according to the invention.

FIG. 1 shows a device for controlling a power flow in an AC network 2 (e.g. a power supply network), wherein the AC network comprises an AC link with three phase lines 2a, 2b and 2c. The device 1 is a universal power flow controller (UPFC). The device 1 comprises a series converter 3 with an AC side 4 and a DC side 5. On its AC side the series converter 3 has three AC terminals 4a, 4b, 4c. The series converter 3 is configured to be (and under operation condition is) connected to the AC network 2 via a series transformer 6. The DC side 5 of the series converter 3 has two DC terminals 5a, 5b (e.g. positive and negative terminals) configure do be connected to a DC link 7. The series converter 3 is a modular multilevel converter (MMC). It comprises three phase modules 8a-c and six converter arms (valves) 9a-f. Every converter arm 9a-f extends between one of the DC poles or terminals 5a,b and one of the AC terminals 4a-c. Each converter arm 9a-f comprises an arm inductance L and a number of switching modules 10 connected in series. In accordance with the embodiment shown in FIG. 1 all switching modules are configured alike, which however is not necessary in general. The number of switching modules 10 in every converter arm 9a-f is in general arbitrary (not restricted to three as shown in the figure) and can be adapted to the given application. According to the example of FIG. 1 the switching modules 10 are so-called half-bridge switching modules. The switching module 10 comprises two terminals X1, X2 to connect e.g. to further, neighboring switching modules. The switching module 10 further comprises two semiconductor switches 11, 12 of the turn-off type with a freewheeling diode D in antiparallel. An energy storage element (capacitor) 13 is connected in parallel to the series connection of the semiconductor switches 11,12. By a proper control of the switches 11, 12 a voltage across the terminals X1, X2 can be achieved which equals to the voltage of the capacitor 13 or a voltage (substantially) equal to zero. Instead of a half-bridge circuit, any (or even all) of the switching modules can comprise any other suitable circuit. An example is the full-bridge configuration known from the prior art.

The device 1 further comprises a shunt converter 14 which is a voltage source converter (e.g. an MMC). The shunt converter 14 is on its AC side 16 connectable (connected in normal operation) to an AC network (e.g. the AC network 2) via a shunt transformer 15. The shunt converter 14 is furthermore connected, on its DC side 17, to the series converter 3 via the DC link 7. A startup circuit 18 is provided between the shunt transformer 15 and the shunt converter 14.

A central control unit CU is provided and configured to control the series converter 3 and the shunt converter 14 by means of controlling the respective semiconductor switches.

The series transformer 6 comprises primary windings 19a-c which are connected in series with the respective phase lines 2a-c of the AC link 2. Each of the primary windings 19a-c can be bypassed by a respective bypass switch (a circuit breaker) 20-22. The series transformer 6 further comprises three secondary windings 23a-c connected to each other in a delta connection forming three delta branches 24a-c.

In addition, the device 1 comprises a bridging arrangement 25 to bridge the series converter 3 in case of a fault. The bridging arrangement 25 comprises three bridging branches 26a-c each connected in parallel to one of the delta branches 24a-c. A first bridging branch 26a comprises a switching unit 27 with two antiparallel thyristors 28a, b. The first bridging branch 26a comprises further a resistance 29 (a resistor element) and an inductance 30 arranged in series with the switching unit 27. A MOV-arrester 31 is provided in parallel with the series circuit of said resistance 29, inductance 30 and switching unit 27. The second bridging branch 26b and the third bridging branch 26c are arranged in a similar manner.

Figure 2:
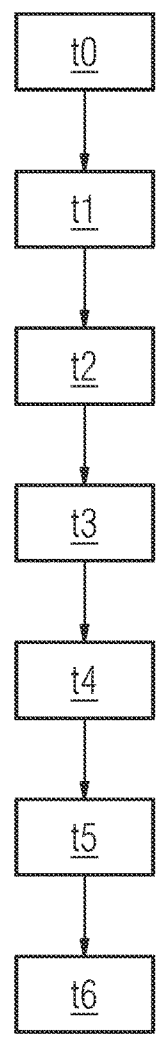
FIG. 2 shows a flow diagram of a first embodiment of a method according to the invention.

In FIG. 2 a flow diagram shows a method of operating a device for controlling power flow in an AC network, for example the device of FIG. 1. Said method of operation comprises in particular a recovery sequence of the series converter in case of a fault. The embodiment of FIG. 2 shows the method steps performed in case of an external fault. In the following all numerals referring to aspects of the device correspond to those used in FIG. 1.

At a time t0 a fault occurs and is detected by a suitable detection device. The series transformer 6 is protected against high voltage by arresters 31.

At a time t1, ca. 1-50 microseconds after t0, the converter is actively blocked, e.g. via a converter current protection.

At a time t2, ca. 1.5-2 ms after t0, the thyristors 28a,b of the bridging arrangement 25 are actively switched on ('fired'). Accordingly, the series converter is protected via the bridging arrangement 25. The fault current is commutated from the converter to the bridging branches 26a-c (in particular through the thyristors) and flow continually through said bridging branches until the fault is cleared. Transients occurring at t2 are largely suppressed due to the presence of the resistor elements 29 in the bridging branches.

At a time t3, ca. 20-30 ms after t0, the series converter is actively deblocked. Before deblocking of the series converter a valve current through the thyristors and a converter current through the series converter are measured and compared with a respective threshold in order to decide whether the deblocking can be initiated.

At a time t4, approx. 50-150 ms after t0, the fault is cleared via a line circuit breaker. From t4 on a normal line current will flow through the bridging branches. The balancing of the series converter 3 is actively started.

At a time t5 the thyristors are blocked (achieved at a current zero crossing by not actively providing a firing pulse). The line current is commutated from the bridging branches to the series converter 3. Transients occurring at t5 are largely suppressed due to the presence of the resistor elements 29 in the bridging branches.

At a time t6, approximately 100-200 ms after t0, the series converter returns to normal operation.

Figure 3:
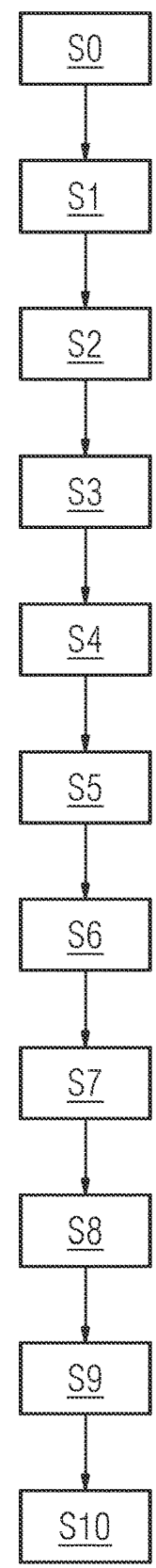
FIG. 3 shows a flow diagram of a second embodiment of a method according to the invention.

In FIG. 3 a flow diagram shows a method of operating a device for controlling power flow in an AC network, for example the device of FIG. 1. Said method of operation comprises in particular a recovery sequence of the series converter in case of a fault. The embodiment of FIG. 3 shows the method steps performed in case of an internal fault. In the following all numerals referring to aspects of the device correspond to those used in FIG. 1.

At a time s0 a fault occurs and is detected by a suitable detection device. The series transformer 6 is protected against high voltage by arresters 31.

At a time s1, ca. 1-50 microseconds after s0, the converter is actively blocked, e.g. via a converter current protection.

At a time s2, ca. 1.5-2 ms after s0, the thyristors 28a,b of the bridging arrangement 25 are actively switched on ('fired'). Accordingly, the series converter is protected via the bridging arrangement 25. The fault current is commutated from the converter to the bridging branches 26a-c (in particular through the thyristors) and flow continually through said bridging branches until the fault is cleared. Transients occurring at s2 are largely suppressed due to the presence of the resistor elements 29 in the bridging branches.

At a time s3, ca. 35-50 ms after s0, the bypass switches 20-22 is switched on, so that the series converter 3 and the series transformer 6 are both protected via the bypass switches. The fault current is commutated from the bridging branches to the bypass switches and flows continually through the bypass switches until the fault is cleared.

At a time s4 the thyristors 28a,b in the bridging branches are blocked (this can be achieved at a current zero crossing by not actively providing a firing pulse). The line current is commutated from the bridging branches to the series converter 3.

At a time s5, approx. 50-150 ms after s0, the fault is cleared via a line circuit breaker.

At a time s6, ca. 300-1000 ms after s0, the AC line is energized, and a nominal power is transmitted.

At a time s7, the series converter 3 is actively deblocked, the thyristors in the bridging branches are actively fired and opening of the bypass switches 20-22 is initiated (in the indicated sequence). Before deblocking of the series converter a valve current through the thyristors and a converter current through the series converter are measured and compared with a respective threshold in order to decide whether the deblocking can be initiated.

At a time s8 the line current flows through the bridging branches 26a-c and no current flows through the bypass switches 20-22. This is confirmed to the central control unit CU by a suitable measurement set up. The balancing of the series converter 3 is actively started.

At a time s9 the thyristors of the bridging arrangement are blocked. Transients occurring at s9 are largely suppressed due to the presence of the resistor elements 29 in the bridging branches.

At a time s10, approximately 100-200 ms after s0, the series converter returns to normal operation.

The invention claimed is:

1. A device for controlling a power flow in an AC network, the device comprising:
a series transformer having primary windings configured to be connected in series with corresponding phase lines of the AC network, said series transformer having secondary windings connected to each other in a delta connection and thus forming respective delta branches;
a series converter with an AC side to connect to the AC network via said series transformer; and
a bridging configuration connected between said series transformer and said series converter and configured to bridge said series converter, wherein said bridging configuration contains three bridging branches each having a switching unit with antiparallel thyristors and a resistance connected in series with said switching unit, each of said bridging branches is disposed in parallel to a respective delta branch of said respective delta branches.

2. The device according to claim 1, wherein each of said bridging branches contains an arrester connected in parallel to said switching unit and said resistance.

3. The device according to claim 1, further comprising at least one bypass switch for bypassing at least one of said primary windings of said series transformer.

4. The device according to claim 1, further comprising:
a shunt transformer;
a DC link; and
a shunt converter with an AC side to connect, via said shunt transformer, to the AC network, and a DC side to connect, via said DC link, to a DC side of said series converter.

5. The device according to claim 1, wherein said resistance (29) has a resistor element.

6. The device according to claim 5, wherein said resistor element is configured so that at least one of said three bridging branches has a residual voltage of at least 1 kV.

7. The device according to claim 1, wherein each of said bridging branches further contains an inductance disposed in series with said switching unit.

8. The device according to claim 1, wherein said series converter is a modular multilevel converter.

9. The device according to claim 5, wherein said resistor element is a dry type resistor element.

10. A method of operation for a device for controlling a power flow in an AC network, which comprises the steps of:
providing a series converter with an AC side to connect to the AC network via a series transformer, the series transformer having primary windings configured to be connected in series with corresponding phase lines of the AC network, the series transformer having secondary windings connected to each other in a delta connection and thus forming respective delta branches;
providing a bridging configuration between the series transformer and the series converter, the bridging configuration being configured to bridge the series converter, wherein the bridging configuration contains three bridging branches each having a switching unit with antiparallel thyristors and a resistor element connected in series with the switching unit, each of the bridging branches is disposed in parallel to a respective delta branch of the respective delta branches; and
detecting a fault status and in a case of an internal or an external fault:
blocking of the series converter;
bridging the series converter by means of the bridging configuration; and
deblocking of the series converter.

11. The method according to claim 10, wherein the series converter is a modular multilevel converter and the method further comprises balancing the series converter after the deblocking.

12. The method according to claim 10, which further comprises detecting if a fault is present and deciding, based on a measurement of an AC line current, whether the internal fault or the external fault is present.

* * * * *